United States Patent
Zhou et al.

(10) Patent No.: US 11,195,283 B2
(45) Date of Patent: Dec. 7, 2021

(54) VIDEO BACKGROUND SUBSTRACTION USING DEPTH

(71) Applicant: Google LLC, Mountain View, CA (US)

(72) Inventors: Guangyu Zhou, San Francisco, CA (US); Qiang Chen, Verona, WI (US); Niklas Enbom, Mountain View, CA (US)

(73) Assignee: Google LLC, Mountain View, CA (US)

(*) Notice: Subject to any disclaimer, the term of this patent is extended or adjusted under 35 U.S.C. 154(b) by 86 days.

(21) Appl. No.: 16/512,344

(22) Filed: Jul. 15, 2019

(65) Prior Publication Data
US 2021/0019892 A1    Jan. 21, 2021

(51) Int. Cl.
*G06T 7/194*    (2017.01)
*G06T 7/162*    (2017.01)
(Continued)

(52) U.S. Cl.
CPC .......... *G06T 7/194* (2017.01); *G06K 9/00234* (2013.01); *G06T 7/11* (2017.01);
(Continued)

(58) Field of Classification Search
CPC . G06T 7/194; G06T 7/162; G06T 7/11; G06T 7/155
See application file for complete search history.

(56) References Cited

U.S. PATENT DOCUMENTS

| 9,443,316 B1 | 9/2016 | Takeda et al. |
|---|---|---|
| 2011/0150337 A1 | 6/2011 | Hong et al. |
| 2016/0171706 A1* | 6/2016 | Somanath ............... G06T 7/194 382/154 |

FOREIGN PATENT DOCUMENTS

WO    WO 2016/029395    3/2016

OTHER PUBLICATIONS

Anatol Frick, et al., "Time-Consistent Foreground Segmentation of Dynamic Content from Color and Depth Video", In: Mester R., Felsberg M. (eds) Pattern Recognition. DAGM 2011. Lecture Notes in Computer Science, vol. 6835. Springer, Berlin, Heidelberg, https://link.springer.com/chapter/10.1007%2F978-3-642-23123-0_30, Aug. 31-Sep. 2, 2011, 296-305 pages.

(Continued)

*Primary Examiner* — Ruiping Li
(74) *Attorney, Agent, or Firm* — IP Spring

(57) ABSTRACT

Implementations described herein relate to methods, systems, and computer-readable media to render a foreground video. In some implementations, a method includes receiving a plurality of video frames that include depth data and color data. The method further includes downsampling the frames of the video. The method further includes, for each frame, generating an initial segmentation mask that categorizes each pixel of the frame as foreground pixel or background pixel. The method further includes determining a trimap that classifies each pixel of the frame as known background, known foreground, or unknown. The method further includes, for each pixel that is classified as unknown, calculating and storing a weight in a weight map. The method further includes performing fine segmentation to obtain a binary mask for each frame. The method further includes upsampling the plurality of frames based on the binary mask for each frame to obtain a foreground video.

19 Claims, 9 Drawing Sheets
(1 of 9 Drawing Sheet(s) Filed in Color)

(51) Int. Cl.
   *G06T 7/11*      (2017.01)
   *G06T 7/155*     (2017.01)
   *G06K 9/00*      (2006.01)

(52) U.S. Cl.
   CPC .............. *G06T 7/155* (2017.01); *G06T 7/162* (2017.01); *G06T 2207/10016* (2013.01); *G06T 2207/10024* (2013.01); *G06T 2207/10028* (2013.01); *G06T 2207/20036* (2013.01); *G06T 2207/20072* (2013.01); *G06T 2207/20076* (2013.01); *G06T 2207/20224* (2013.01); *G06T 2207/30201* (2013.01)

(56) References Cited

OTHER PUBLICATIONS

Carsten Rother, et al., ""GrabCut": interactive foreground extraction using iterated graph cuts", Proceeding SIGGRAPH '04 ACM SIGGRAPH 2004, ACM Transactions on Graphics (TOG), vol. 23, Issue 3, Aug. 8-12, 2004, 309-314 pages.

M. Harville, et al., "Adaptive video background modeling using color and depth", IEEE International Conference on Image Processing (ICIP) 2001, Thessaloniki, Greece,, Oct. 7-10, 2001, 4 pages.

Qiong Wu, et al., "Robust Real-Time Bi-Layer Video Segmentation Using Infrared Video", In Proceedings of the 2008 Canadian Conference on Computer and Robot Vision, Windsor, ON, Canada, ; pp. 8794, May 28-30, 2008, 87-94 pages.

Bazarevsky, et al., "Mobile Real-time Video Segmentation", Google AI blog, https://ai.googleblog.com/2018/03/mobile-real-time-video-segmentation.html, Mar. 1, 2018, 6 pages.

"International Search Report and Written Opinion in International Application No. PCT/US2020/028376, filed Apr. 15, 2020", 15 pages.

Faizan Ahmad, et al., ""Image-based Face Detection and Recognition: "State of the Art"""", URL: https://arxiv.org/ftp/arxiv/papers/1302/1302.6379.pdf [retrieved on Jul. 16, 2020], 4 pages.

Jue Wang, et al., ""Image and Video Matting: A Survey"", Foundations and Tends? In Computer Graphics and Vision, vol. 3, No. 2, Jan. 1, 2007, pp. 97-175.

Qiang Liu, et al., Journal of Visual Communication and Image Representation, Academic Press, Inc, US, vol. 22, No. 5, Feb. 2, 2011, pp. 367-377.

\* cited by examiner

Example video frame (502)

Mask (504)

Segmentation with poor neck area (602)

Segmentation with poor hand area (612)

Example Trimap 702

VIDEO BACKGROUND SUBSTRACTION USING DEPTH

BACKGROUND

Segmenting an image into foreground and background portions is used in many image and video applications. For example, in video applications such as video conferencing, telepresence in Virtual Reality (VR) or Augmented Reality (AR), there may be a need to remove the background and replace it with a new one. In another example, segmentation is often used for portrait mode and bokeh, where the background portions of an image are blurred.

There are many challenges in segmentation of an image or video. One challenge is color camouflage, which occurs when videos or images include foreground objects that have a color that is similar to that of a color in the background. Other challenges include a moving or changing background, color shadows, scenes without a foreground portion (e.g., a video conference with no person present), and illumination change in the scene during the time the image or video is captured.

Some image capture devices, e.g., desktop cameras, cameras in mobile devices, etc. can capture depth data together with color data of an image or video. Such depth data can be used for segmentation. However, such depth data is often inaccurate, e.g., due to the quality of the depth sensor, lighting conditions and objects in the captured scene, etc. Inaccurate data is another challenge when segmenting an image or video using depth data.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementation described herein relate to methods, systems, and computer-readable media to obtain a foreground video. In some implementations, a computer-implemented method includes receiving a plurality of frames of a video. Each frame of the video may include depth data and color data for a plurality of pixels. The method further includes downsampling each frame of the plurality of frames of the video. The method further includes, after the downsampling and for each frame, generating an initial segmentation mask that categorizes each pixel of the frame as foreground pixel or background pixel based on the depth data. The method further includes, for each frame, determining a trimap that classifies each pixel of the frame as one of known background, known foreground, or unknown. The method further includes, for each frame and for each pixel of the frame that is classified as unknown, calculating a weight for the pixel and storing the weight in a weight map. The method further includes, for each frame, performing fine segmentation based on the color data, the trimap, and the weight map to obtain a binary mask for the frame. The method further includes upsampling the plurality of frames based on the binary mask for each respective frame to obtain a foreground video.

In some implementations, generating the initial segmentation mask can include setting a pixel as foreground pixel if a depth value associated with the pixel is within a depth range and setting the pixel as background pixel if the depth value associated with the pixel is outside the depth range. In some implementations, generating the initial segmentation mask can further include performing one or more of a morphological opening process or a morphological closing process.

In some implementations, the method can further include detecting a head bounding box based on one or more of the color data or the initial segmentation mask. In some implementations, detecting the head bounding box can include converting the frame to grayscale and performing histogram equalization. The method can further include detecting one or more faces in the frame by Haar cascade face detection. Each face of the one or more faces can be associated with a face area that includes face pixels for the face.

In some implementations, the method can further include determining whether each face of the one or more faces is valid. In some implementations, the face is determined as valid if it is verified that a threshold proportion of pixels of the face area for the face are categorized as foreground pixels in the initial segmentation mask and that at least a threshold percentage of pixels of the face area for the face meet a skin color criterion. In some implementations, the method can further include, for each face determined as valid, expanding the face area for each face to obtain a head area corresponding to the face. The head bounding box can include the head area for each face determined as valid. In some implementations, if no face is determined to be valid, the method can further include analyzing the initial segmentation mask to detect a head and determining whether the head is valid based by head skin color validation. if the head is determined to be valid, the method can further include selecting a bounding box associated with the head as the head bounding box.

In some implementations, generating the initial segmentation mask can include assigning a mask value to each pixel. In the initial segmentation mask, each foreground pixel can be assigned the mask value of 255 and each background pixel can be assigned the mask value of 0. In these implementations, determining the trimap can include, for each pixel of the frame that is not in the head bounding box, calculating an L1 distance between a pixel location of the pixel and a mask boundary of the initial segmentation mask wherein the mask boundary includes locations where at least one foreground pixel is adjacent to at least one background pixel in the initial segmentation mask. If the L1 distance meets a foreground distance threshold and the pixel is categorized as foreground pixel, the method can further include classifying the pixel as known foreground. If the L1 distance meets a background distance threshold and the pixel is categorized as background pixel, the method can further include classifying the pixel as known background, and if the pixel is not classified as known foreground and not classified as known background, the method can further include classifying the pixel as unknown.

Determining the trimap can further include identifying, for each pixel in the head bounding box, whether the pixel is known foreground, known background, or unknown. Identifying whether the pixel is known foreground, known background, or unknown can include classifying the pixel as known foreground if the pixel is in an inner mask determined for the head bounding box, classifying the pixel as known background if the pixel is outside an outer mask determined for the head bounding box, and classifying the pixel as unknown if the pixel is not classified as known foreground and known background.

In some implementations, the method can further include detecting whether uniform bright background is present near a hair area of a head in the head bounding box and if uniform bright background is detected, performing hair area extension for the head based on the head bounding box, the color data, and the initial segmentation mask. In these implementations, after performing the hair area extension, a dilation size for the outer mask is increased.

In some implementations, the method can further include maintaining a background image for the video, wherein the background image is a color image of same size as each frame of the video. The method can further include, prior to performing the fine segmentation, updating the background image based on the trimap. In these implementations, calculating the weight for the pixel can include calculating Euclidean distance between a color of the pixel and a background color of the background image, determining a probability that the pixel is background pixel based on the Euclidean distance, and if the probability meets a background probability threshold, assigning a background weight to the pixel in the weight map.

In some implementations, the method can further include identifying one or more skin regions in the frame based on skin color detection. The one or more skin regions exclude face regions. In these implementations, the method can further include, for each pixel of the frame that is within the one or more skin regions, classifying the pixel as unknown and assigning the pixel a zero weight in the weight map. The method can further include assigning the pixel a background weight in the weight map if a color of the pixel and the background color of the background image meet a similarity threshold. The method can further include assigning the pixel a foreground weight in the weight map if the color of the pixel is skin color. The method can further include assigning the pixel a foreground weight in the weight map if the color of the pixel and the background color of the background image meet a dissimilarity threshold.

In some implementations, the plurality of frames of the video can be in a sequence. In these implementations, the method can further include, for each frame, comparing the initial segmentation mask with a previous frame binary mask of an immediately previous frame in the sequence to determine a proportion of the pixels of the frame that are categorized similar to pixels of the previous frame. The method can further include calculating a global coherence weight based on the proportion. In these implementations, calculating the weight for the pixel and storing the weight in the weight map can include determining the weight based on the global coherence weight and distance between the pixel and a mask boundary of the previous frame binary mask. In some implementations, the weight for the pixel is positive if a corresponding pixel was categorized as foreground pixel in the previous frame binary mask and the weight is negative if the corresponding pixel was not categorized as foreground pixel in the previous frame binary mask.

In some implementations, performing fine segmentation can include applying a graphcut technique to the frame, wherein the graphcut technique is applied to pixels that are classified as unknown.

In some implementations, the method can further include, after performing fine segmentation, applying a temporal low pass filter to the binary mask. Applying the temporal low pass filter can update the binary mask based on similarity between one or more previous frames and the frame.

Some implementations can include a non-transitory computer-readable medium with instructions stored thereon. The instructions, when executed by one or more hardware processors, cause the processors to perform operations that include receiving a plurality of frames of a video. Each frame of the video may include depth data and color data for a plurality of pixels. The operations further include downsampling each frame of the plurality of frames of the video. The operations further include, after the downsampling and for each frame, generating an initial segmentation mask that categorizes each pixel of the frame as foreground pixel or background pixel based on the depth data. The operations further include, for each frame, determining a trimap that classifies each pixel of the frame as one of known background, known foreground, or unknown. The operations further include, for each frame and for each pixel of the frame that is classified as unknown, calculating a weight for the pixel and storing the weight in a weight map. The operations further include, for each frame, performing fine segmentation based on the color data, the trimap, and the weight map to obtain a binary mask for the frame. The operations further include upsampling the plurality of frames based on the binary mask for each respective frame to obtain a foreground video.

In some implementations, the non-transitory computer-readable medium can include further instructions that, when executed by one or more hardware processors, cause the processors to perform operations that include maintaining a background image for the video that is a color image of same size as each frame of the video. The operations can further include, prior to performing the fine segmentation, updating the background image based on the trimap. In these implementations, the operation of calculating the weight for the pixel can include calculating Euclidean distance between a color of the pixel and a background color of the background image, determining a probability that the pixel is background pixel based on the Euclidean distance, and if the probability meets a background probability threshold, assigning a background weight to the pixel in the weight map.

Some implementations can include a system comprising one or more hardware processors coupled to a memory. The memory can include instructions stored thereon. The instructions, when executed by one or more hardware processors, cause the processors to perform operations that include receiving a plurality of frames of a video. Each frame of the video may include depth data and color data for a plurality of pixels. The operations further include downsampling each frame of the plurality of frames of the video. The operations further include, after the downsampling and for each frame, generating an initial segmentation mask that categorizes each pixel of the frame as foreground pixel or background pixel based on the depth data. The operations further include, for each frame, determining a trimap that classifies each pixel of the frame as one of known background, known foreground, or unknown. The operations further include, for each frame and for each pixel of the frame that is classified as unknown, calculating a weight for the pixel and storing the weight in a weight map. The operations further include, for each frame, performing fine segmentation based on the color data, the trimap, and the weight map to obtain a binary mask for the frame. The operations further include upsampling the plurality of frames based on the binary mask for each respective frame to obtain a foreground video.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Embodiments described herein generally relate to segmenting a video or image into background and foreground portions. In particular, embodiments relate to obtaining a foreground portion of a video or image.

One or more implementations described herein include methods, devices, and computer-readable media with instructions to obtain a foreground video. In some implementations, the foreground video may have a blank background. Further, some implementations may generate a composite video that includes a foreground video segmented from a captured scene, overlaid on a background different from the original captured background. In some implementations, segmentation to obtain the foreground video is performed in real time, e.g., to provide the foreground video in a video conference.

Figure 1:
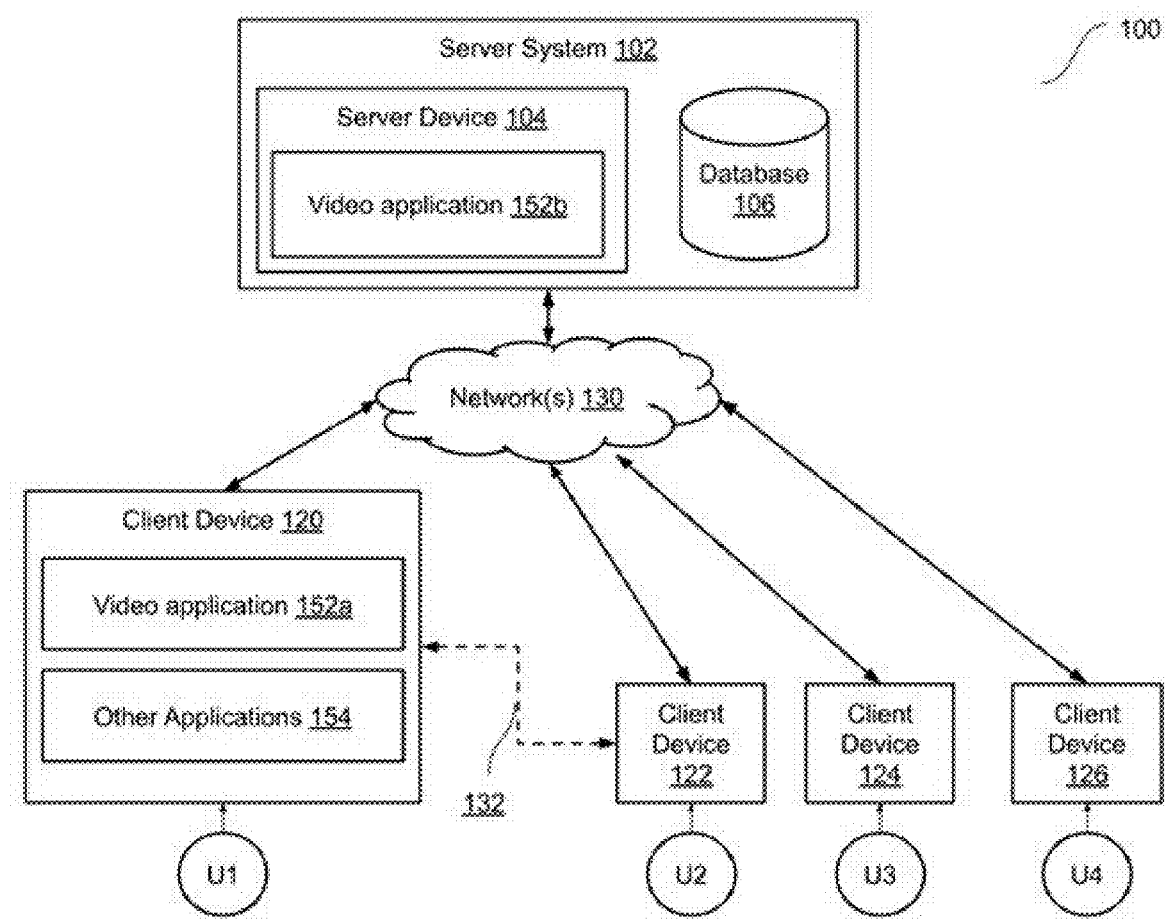
FIG. 1 is a block diagram of an example network environment which may be used for one or more implementations described herein.

FIG. 1 illustrates a block diagram of an example network environment 100, which may be used in some implementations described herein. In some implementations, network environment 100 includes one or more server systems, e.g., server system 102 in FIG. 1. Server system 102 can communicate with a network 130, for example. Server system 102 can include a server device 104 and a database 106 or other storage device. In some implementations, server device 104 may provide a video application 152*b*, e.g., a video calling application, an augmented reality application, a virtual reality application, etc.

Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communications between two client devices 120 and 122 is shown by arrow 132.

For ease of illustration, FIG. 1 shows one block for server system 102, server device 104, database 106, and shows four blocks for client devices 120, 122, 124, and 126. Server blocks 102, 104, and 106, may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, database 106 and/or other storage devices can be provided in server system block(s) that are separate from server device 104 and can communicate with server device 104 and other server systems via network 130.

Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In some implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102 and/or via a network service, e.g., a social network service or other type of network service, implemented on server system 102. For example, respective client devices 120, 122, 124, and 126 may communicate data to and from one or more server systems, e.g., system 102.

In some implementations, the server system 102 may provide appropriate data to the client devices such that each client device can receive communicated content or shared content uploaded to the server system 102 and/or network service. In some examples, users U1-U4 can interact via audio/video calling, audio, video, or text chat, or other communication modes or applications. A network service implemented by server system 102 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide a video application 152*a* and one or more other applications 154. Client devices 122-126 may also provide similar applications.

For example, video application 152 may provide a user of a respective client device (e.g., users U1-U4) with the ability to participate in a video call with one or more other users. In a video call, with user permission, a client device may transmit a locally captured video to other devices that participate in the video call. For example, such video can include live video captured using a camera of a client device, e.g., a front-facing camera, a rear camera, and/or one or more other cameras. In some implementations, the camera may be separate from the client device and may be coupled to the client device, e.g., via a network, via a hardware port of the client device, etc. Video application 152 may be a software application that executes on client device 120. In some implementations, video application 152 may provide a user interface. For example, the user interface may enable a user to place video calls to one or more other users, receive video calls from other users, leave video messages for other users, view video messages from other users, etc.

Video application 152a may be implemented using hardware and/or software of client device 120, as described with reference to FIG. 9. In different implementations, video application 152a may be a standalone client application, e.g., executed on any of client devices 120-124, or may work in conjunction with video application 152b provided on server system 102. Video application 152a and video application 152b may provide video calling (including video calls with two or more participants) functions, audio or video messaging functions, address book functions, etc.

In some implementations, client device 120 may include one or more other applications 154. For example, other applications 154 may be applications that provide various types of functionality, e.g., calendar, address book, email, web browser, shopping, transportation (e.g., taxi, train, airline reservations, etc.), entertainment (e.g., a music player, a video player, a gaming application, etc.), social networking (e.g., messaging or chat, audio/video calling, sharing images/video, etc.), image capture and editing (e.g., image or video capture, video editing, etc.), and so on. In some implementations, one or more of other applications 154 may be standalone applications that execute on client device 120. In some implementations, one or more of other applications 154 may access a server system that provides data and/or functionality of applications 154.

A user interface on a client device 120, 122, 124, and/or 126 can enable display of user content and other content, including images, video, data, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device including or connected to a display device can display content posts stored on storage devices local to the client device, e.g., received previously over communication networks.

Figure 2:
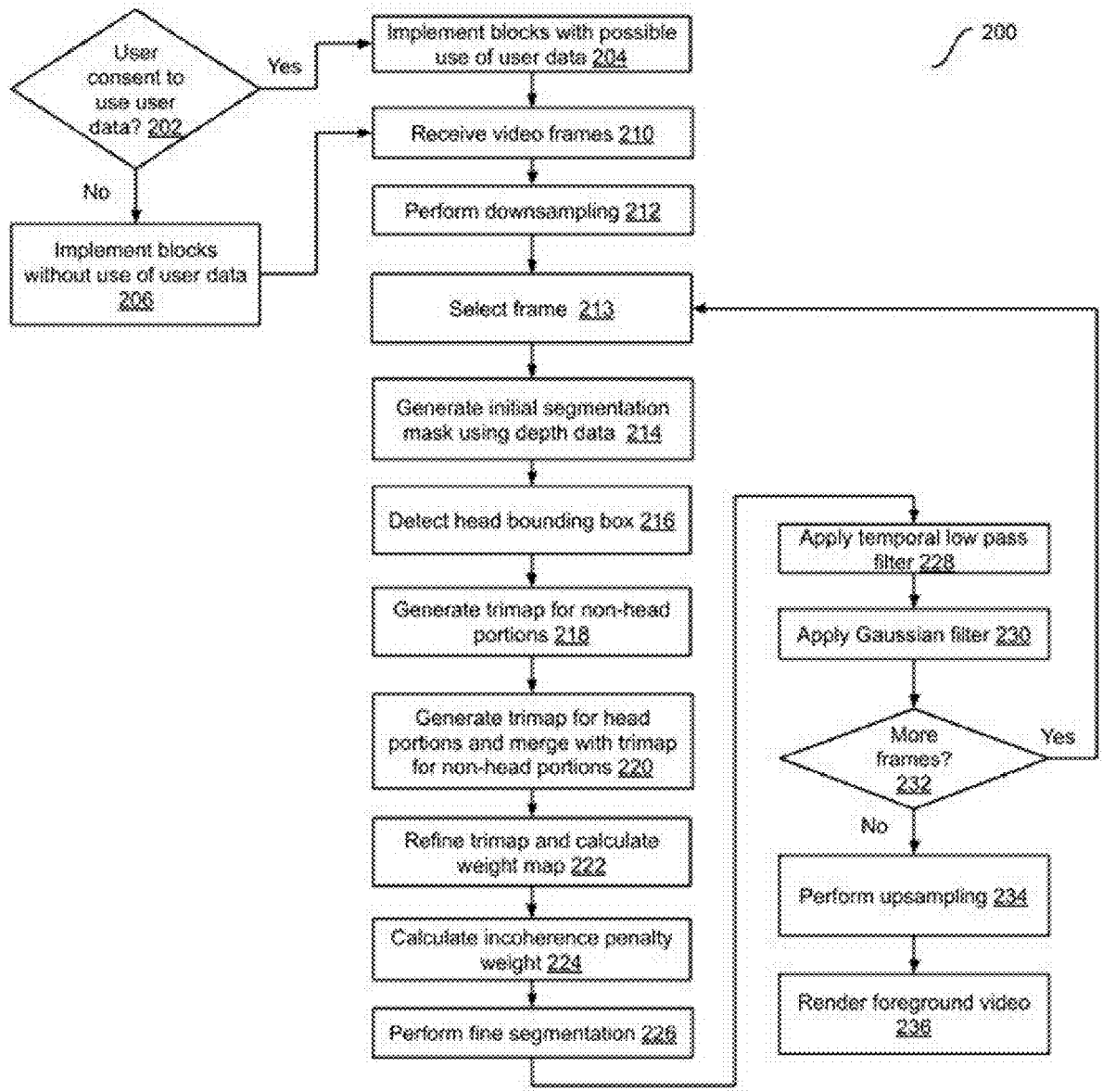
FIG. 2 is a flow diagram illustrating an example method to determine a foreground mask, according to some implementations.

FIG. 2 is a flow diagram illustrating one example of a method 200 to obtain a foreground video, according to some implementations. In some implementations, method 200 can be implemented, for example, on a server system 102 as shown in FIG. 1. In some implementations, some or all of the method 200 can be implemented on one or more client devices 120, 122, 124, or 126 as shown in FIG. 1, one or more server devices, and/or on both server device(s) and client device(s). In the described examples, the implementing system includes one or more digital processors or processing circuitry ("processors") and one or more storage devices (e.g., a database 106 or other storage). In some implementations, different components of one or more servers and/or clients can perform different blocks or other parts of the method 200. In some examples, a first device is described as performing blocks of method 200. Some implementations can have one or more blocks of method 200 performed by one or more other devices (e.g., other client devices or server devices) that can send results or data to the first device.

In some implementations, the method 200, or portions of the method, can be initiated automatically by a system. In some implementations, the implementing system is a first device. For example, the method (or portions thereof) can be periodically performed, or performed based on one or more particular events or conditions, e.g., an application (e.g., a video calling application) being initiated by a user, a camera of a user device being activated to capture video, a video editing application being launched, and/or one or more other conditions occurring which can be specified in settings read by the method. In some implementations, such conditions can be specified by a user in stored custom preferences of the user.

In one example, the first device can be a camera, cell phone, smartphone, tablet computer, wearable device, or other client device that can capture a video, and can perform the method 200. In another example, a server device can perform the method 200 for the video, e.g., a client device may capture video frames that are processed by the server device. Some implementations can initiate method 200 based on user input. A user (e.g., operator or end-user) may, for example, have selected the initiation of the method 200 from a displayed user interface, e.g., application user interface or other user interface. In some implementations, method 200 may be implemented by a client device. In some implementations, method 200 may be implemented by a server device.

A video as referred to herein can include a sequence of image frames, also referred to as frames. Each image frame may include color data and depth data for a plurality of pixels. For example, color data may include color values for each pixel and depth data may include depth values, e.g., a distance from the camera that captured the video. For example, a video may be a high definition video where each image frame of the video has a size of 1920×1080, for a total of 1,958,400 pixels. The techniques described herein can be used for other video resolutions, e.g., standard definition video, 4K video, 8K video, etc. For example, the video may be captured by a mobile device camera, e.g., a smartphone camera, tablet camera, wearable camera, etc. In another example, the video may be captured by a computer camera, e.g., a laptop camera, a desktop camera, etc. In yet another example, the video may be captured by a video-calling appliance or device, such as a smart speaker, smart home appliance, dedicated video-calling device, etc. In some implementations, the video may also include audio data. Method 200 may begin at block 202.

In block 202, it is checked whether user consent (e.g., user permission) has been obtained to use user data in the implementation of method 200. For example, user data can include videos captured by a user using a client device, videos stored or accessed by a user, e.g., using a client device, video metadata, user data related to the use of a video calling application, user preferences, etc. One or more blocks of the methods described herein may use such user data in some implementations.

If user consent has been obtained from the relevant users for which user data may be used in the method 200, then in block 204, it is determined that the blocks of the methods herein can be implemented with possible use of user data as described for those blocks, and the method continues to block 210. If user consent has not been obtained, it is determined in block 206 that blocks are to be implemented without the use of user data, and the method continues to block 210. In some implementations, if user consent has not been obtained, blocks are implemented without the use of user data and with synthetic data and/or generic or publicly-accessible and publicly-usable data. In some implementations, if user consent has not been obtained, method 200 is not performed.

In block 210 of method 200, a plurality of video frames of a video is received. For example, the plurality of video frames may be captured by a client device. In some implementations, the plurality of video frames may be captured during a live video call that the client device is a part of, e.g., via a video calling application. In some implementations, the plurality of video frames may be previously recorded, e.g., part of a recorded video. The video may include a plurality of frames in a sequence. In some implementations, each frame may comprise color data and depth data for a plurality of pixels.

In some implementations, color data may be captured at 30 frames per second and depth data may be captured at 15 frames per second, such that only half of the captured frames include depth data at the time of capture. For example, depth data may be captured for alternate frames. In the implementations where one or more of the captured frames do not have depth data, depth data of an adjacent frame, e.g., the previous frame, may be utilized as depth data. For example, upon receiving the video frames, it may be determined whether one or more frames do not have depth data. If a frame is missing depth data, depth data of an adjacent frame, e.g., the immediately previous frame in the sequence of frames of the video, may be used as the depth data for the frame. Block 210 may be followed by block 212.

In block 212, the video is downsampled. In some implementations, downsampling includes resizing the video to a smaller size. For example, if the video is 1920×1080, the video may be resized to one-quarter of the size, 480×270. The resizing reduces computational complexity to perform method 200, e.g., since the total data to be processed is also reduced to one-quarter. For example, in some implementations, process time to implement method 200 may be about 90 ms per frame, after the downsampling. In some implementations, e.g., when the device that implements method 200 has high computational capability, no downsampling may be performed. In some implementations, the size of the downsampled video may be selected based on the size of the received video, the computational capability of the device that implements method 200, etc. In various implementations, color data and depth data of the frames is downsampled directly. In various implementations, the bit depth of the color data and the depth data does not change after downsampling. Selection of the downsampling ratio, e.g., the ratio of the number of pixels of the downsampled frame to the number of pixels of the original video frame may be based on a tradeoff between processing time and quality of segmentation. In some implementations, the downsampling ratio can be selected based on the available processing capacity of a device on which method 200 is implemented to achieve a suitable tradeoff In some implementations, the downsampling ratio may be determined heuristically. Block 212 may be followed by block 213.

In block 213, a frame of the downsampled video is selected. Block 213 may be followed by block 214.

In block 214, an initial segmentation mask is generated that categorizes each pixel of the selected frame or image as a foreground pixel or a background pixel. In some implementations, the initial segmentation mask is based on a depth range. The depth value for each pixel may be compared to the depth range to determine whether the depth value is within the depth range. If the depth value is within the depth range, the pixel is categorized as a foreground pixel. If the depth value is outside the depth range, the pixel is categorized as a background pixel. The initial segmentation mask thus generated includes a value for each pixel of the selected frame, indicating whether the pixel is a foreground pixel or a background pixel. In some implementations, the depth range may be 0.5 meters to 1.5 meters. For example, this range may be suitable when method 200 is performed for a video calling application, or other application where one or more users that participate in a video call are close to a camera that captures the video, e.g., in a conference room, at a desk, etc. In different applications, different depth ranges may be used, e.g., selected based on typical distance between foreground objects and the camera for those applications.

In some implementations, the initial segmentation mask may include a mask value for each pixel of the frame. For example, if a pixel is determined to be a background pixel, a mask value of 0 may be assigned to the pixel, and if a pixel is determined to be a foreground pixel, a mask value of 255 may be assigned to the pixel.

In some implementations, generating the initial segmentation mask may further include performing a morphological opening process. The morphological opening process may remove noise from the initial segmentation mask. In some implementations, segmenting the image may further include performing a morphological closing process. The morphological closing process may fill one or more holes in the initial segmentation mask.

Noise and/or holes in the segmentation mask may arise due to various reasons. For example, when the video frames are captured by a client device using a depth-capable camera, the depth values for one or more pixels may be determined inaccurately. Such inaccuracies may arise, e.g., due to lighting conditions in which the frame is captured, due to sensor error, due to features in the scene that is captured, etc. For example, a hole may arise if no depth value is captured by the camera for one or more pixels. For example, if the camera uses a reflection-based sensor to measure depth, one or more pixels may have a depth value of infinity if no reflected light is detected from the scene. Such pixels may lead to holes in the segmentation mask. Block 214 may be followed by block 216.

In block 216, a head bounding box may be detected. The head bounding box may specify a region of the frame that includes a head or is likely to include a head. For example, when the video includes a person, the head bounding box may specify pixels of the frame that correspond to the head of the person. In some implementations, e.g., when the video includes multiple persons, the head bounding box may specify multiple regions of the frame, each region corresponding to a particular person. In some implementations, the head bounding box may be detected based on the color data, the initial segmentation mask, or both. Head bounding box detection may be performed using any suitable method. An example method to detect the head bounding box is described with reference to FIG. 3. Block 216 may be followed by block 218.

In block 218, a trimap is generated for non-head portions of the frame, e.g., portions of the frame that are outside the head bounding box. In some implementations, the trimap may be generated based on the initial segmentation mask. The trimap may classify each pixel of the image as being one of known foreground, known background, and unknown.

In some implementations, generating the initial segmentation mask may include calculating an L1 distance between a pixel location of each pixel of the frame that is a non-head portion (outside the head bounding box) and a mask boundary of the initial segmentation mask. The mask boundary may correspond to locations, e.g., expressed in pixel coordinates, where at least one foreground pixel is adjacent to at least one background pixel in the initial segmentation mask.

In some implementations, if the L1 distance meets a foreground distance threshold and the pixel is categorized as foreground pixel in the initial segmentation mask, the pixel is classified in the trimap as known foreground. For example, in some implementations, the foreground distance threshold may be set as 24. In these implementations, pixels that have L1 distance greater than 24 from the mask boundary and a mask value of 255 (foreground pixel) are classified as known foreground. In different implementations, a different foreground distance threshold may be used.

Further, if the L1 distance meets a background distance threshold and the pixel is categorized as background pixel in the initial segmentation mask, the pixel is classified in the trimap as known background. For example, in some implementations, the background distance threshold may be set as 8. In these implementations, pixels that have an L1 distance greater than 8 from the mask boundary and a mask value of 0 (background pixel) are classified as known background. In different implementations, a different background distance threshold value may be used. In some implementations, the threshold value may be based on quality of the initial segmentation mask and/or the downsampling ratio. In some implementations, a higher threshold may be selected when the quality of the initial segmentation mask is low, and a lower threshold may be selected when the quality of the initial segmentation mask is high. In some implementations, the threshold value may decrease proportionally to the downsampling ratio.

Further, each pixel that is not classified as known foreground and not classified as known background is classified in the trimap as unknown. The generated trimap may indicate known foreground, known background, and unknown regions of portions of the frame that are outside the head bounding box. Block 218 may be followed by block 220.

In block 220, a trimap is generated for head portions of the frame, e.g., portions of the frame that are within the head bounding box. In some implementations, generating the trimap may include identifying, for each pixel in the head bounding box, whether the pixel is known foreground, known background, or unknown.

In some implementations, identifying the pixel as known foreground may include classifying the pixel as known foreground if the pixel is in an inner mask determined for the head bounding box. Further, in these implementations, identifying the pixel as known background may include classifying the pixel as known background if the pixel is outside an outer mask determined for the head bounding box. Further, in these implementations, identifying the pixel as unknown may include classifying pixels that are not classified as known foreground and not classified as known background as unknown. The generated trimap may indicate known foreground, known background, and unknown regions of portions of the frame that are within the head bounding box. In different implementations, the inner mask and the outer mask may be obtained using any suitable technique. An example method to obtain the inner mask and the outer mask is described with reference to FIG. 4.

After generating the trimap for the head portion of the frame, it may be merged with the trimap for non-head portions of the image to obtain a trimap for the entire frame. In this manner, the generated trimap classifies each pixel of the frame as known background (BGD), known foreground (FGD), or unknown. Block 220 may be followed by block 222.

Separate generation of the trimap for the head portion, e.g., by utilizing the inner mask and outer mask for trimap generation, can provide an improved segmentation result due to recognition and incorporation of head-specific features in the trimap generation for head portions.

In block 222, the generated trimap is refined and a weight map is calculated. For example, the weight map may be calculated for pixels that are classified as unknown in the trimap. The weight map may represent the level or extent to which each pixel classified as unknown leans to the foreground or the background in the frame. A background image is determined and maintained for the video. For example, in many situations such as when a user is participating in video calls (or video games) from a conference room, a desktop computer, or a mobile device, the device camera may be stationary and the scene may be static, e.g., the background portion of the frame may not change from frame to frame.

A background image may be determined based on the binary mask of one or more frames of the video. The maintained background image may be a color image of the same size as each frame of the video (or downsampled video). For example, the maintained background image may include a color value for each pixel that was identified as background in the binary mask of one or more previous frames of the video. The maintained background image thus includes information that indicates the background color of the scene at various pixel locations. In some implementations, a moving average value for each pixel may be determined from prior frames in the sequence of frames, e.g., for 2 prior frames, for 5 prior frames, for 10 prior frames, etc. In these implementations, a Gaussian model may be used to estimate a likelihood that the pixel in the current frame is background, based on the moving average from the prior frames.

In some implementations, maintaining the background image may include updating the background image based on the trimap, e.g., pixels that are classified as background (BGD) in the trimap for the frame. For example, the background image may be updated using the formula:

$$\text{maintained\_background} = 0.8 * \text{prior\_background} + 0.2 * \text{new\_background}$$

where prior_background is the color value for a pixel in the background prior to the updating, new_background is the color value for the corresponding pixel in the trimap, and maintained_background is the updated background image. The coefficients for the prior background (0.8) and the new background (0.2) may be chosen based on the application. In some implementations, the coefficients may be chosen based on prior estimates of the stability of the camera. For example, for a fixed camera, coefficient value of 0.8 may be chosen for the prior background and coefficient value of 0.2 may be chosen for the new background. In another example, e.g., for a handheld camera or other camera that experiences movement, coefficient value of 0.5 may be chosen for the prior background and coefficient value of 0.5 may be chosen for the new background, e.g., since the historical data may be less valuable due to movement of the camera.

The maintained background image may be utilized to determine a weight map that specifies a weight for each pixel in the trimap. In some implementations, determining the weight map may include calculating a weight for each pixel of the frame that is classified as unknown in the trimap. In some implementations, calculating the weight for a pixel may include calculating the Euclidean distance between the color of the pixel and the background color of the background image. Calculating the weight may further include determining a probability that the pixel is a background pixel based on the Euclidean distance. In some implementations, the probability (p) may be calculated by using the formula:

$$p = \exp(-0.01 * |\text{pixel color} - \text{maintained background color}|^2)$$

In some implementations, the pixel color and the maintained background color may be in the red-green-blue (RGB) color space. Calculating the weight based on the probability further includes determining whether the probability meets a background probability threshold. For example, the background probability threshold may be set as 0.5 such that pixels that have p>0.5 meet the background probability threshold. If the pixel meets the background probability threshold, a background weight (e.g., negative value) is assigned to the pixel in the weight map. In some implementations, the weight value may be based on estimate of camera stability, e.g., a higher weight value may be used when the camera is stable, while a lower weight value may be used when the camera has movement during capture of the video.

Further, skin color detection may be performed to identify one or more skin regions in the frame, excluding face regions. For example, face regions may be excluded by performing skin color detection on the frame except for portions of the frame that are within the head bounding box. For example, the one or more skin regions may correspond to a hand, an arm, or other portions of the body that are depicted in the frame.

In some implementations, color values of pixels in the color data of the frame may be RGB values. In some implementations, skin color detection may be performed for each pixel to determine whether it may be of skin color by using the formula:

$$\text{is\_skin} = R > 95 \text{ AND } G > 40 \text{ AND } B > 20 \text{ AND } (R - G) > 15 \text{ AND } R > B$$

where R, G, and B refer to the red, green, and blue color channel values for the pixel.

Based on the pixels identified as likely of skin color, one or more skin regions may be identified. For example, the one or more skin regions may be identified as regions that include pixels that are within a threshold distance of a skin color pixel. For example, the threshold distance may be 40.

In some implementations, after identifying one or more skin regions, the trimap may be updated to set each pixel in the one or more skin regions as unknown. Further, a zero weight may be assigned to each such pixel. Still further, the color of the pixel may be compared with the background color of the background image. If the pixel color and the background color meet a similarity threshold, the pixel is assigned a background weight (e.g., a negative value) in the weight map. For example, the similarity threshold may be a probability threshold (e.g., p>0.5) as described above.

If the pixel is a skin color pixel (as identified using skin color detection), the pixel is assigned a foreground weight (e.g., a positive value) in the weight map. Still further, if the pixel color and the color of the background meet a dissimilarity threshold, the pixel is assigned a foreground weight (e.g., a positive value) in the weight map. For example, the dissimilarity threshold may be a probability threshold (e.g., p<0.0025). Other pixels in the skin region may retain the zero weight. Block 222 may be followed by block 224.

In block 224, an incoherency penalty weight may be calculated for pixels that are classified as unknown in the trimap. In some implementations, the initial segmentation mask may be compared with a previous frame binary mask of an immediately previous frame in the sequence of frames to determine the proportion of pixels of the frame that are categorized similar to pixels of the previous frame. The proportion may be defined as the similarity between the frames. For example, the similarity may be low when there is significant motion in the scene and high for mostly static scenes. A global coherence weight may be calculated based on the similarity. For example, in some implementations, the global coherence weight may be calculated using the formula:

$$w = A * 2/1 + \exp(50 * (1 - \text{similarity})))$$

where w is the global coherence weight and A is a predefined constant.

The formula ensures that the global coherence weight drops exponentially when similarity is low, e.g., to near zero. In this case, the global coherence weight has no impact of the weight map. On the other hand, the global coherence weight may be higher when the similarity is high. In this manner, the global coherence weight described herein is a function of frame similarity.

Further, a weight for pixels that are classified as unknown in the trimap may be calculated based on the global coherence weight. In some implementations, the weight for the pixel may be determined based on the global coherence weight and distance between the pixel and a mask boundary of the previous frame binary mask. When a corresponding pixel in the binary mask is classified as foreground pixel in the previous frame binary mask, the weight calculated for the pixel is positive. When the corresponding pixel in the binary mask is classified as background pixel in the previous frame binary mask, the weight calculated for the pixel is negative. In some implementations, the weight may be proportional to the distance. In some implementations, the global coherence weight may be used as a cutoff value for the weight, e.g., the value of the weight may be set as equal to the global coherence weight when the distance is equal to or greater than a cutoff distance value. The calculated weight may be stored in the weight map. In some implementations, the cutoff distance value may be determined experimentally, e.g., based on segmentation results obtained for a large number of videos. In some implementations, a higher cutoff distance value may correspond to a likelihood that segmentation of adjacent frames is different, corresponding to weaker coherence between successive frames.

Calculating weights for pixels classified as unknown in the trimap and storing the weight map in this manner can ensure consistency between segmentation of consecutive frames, e.g., when the frames are similar, corresponding pixels in successive frames are more likely to have similar classifications in the binary mask. This can reduce the visual effect of flickering that may occur when such pixels have different classifications in the binary masks of consecutive frames. Block 224 may be followed by block 226.

In block 226, a binary mask for the frame is obtained by performing fine segmentation based on the color data, the trimap, and the weight map. In some implementations, performing fine segmentation may include applying a graphcut technique to the frame. The color data, the trimap, and the weight map may be provided as input when applying the graphcut technique.

In graphcut techniques, color data is utilized to create background and foreground color models globally. For example, a Gaussian Mixture Model (GMM) may be used to construct such color models. The GMM utilizes initial labeling of foreground and background pixels, e.g., obtained via user input. The GMM generates a new pixel distribution that labels unknown pixels as likely background or likely foreground based on a level of similarity of color values (e.g., RGB values) of each unknown pixel with pixels that have been labeled in the initial labeling as foreground or background.

In graphcut techniques, a graph that includes nodes corresponding to each pixel of the image is generated. The graph further includes two additional nodes: a source node that is connected to each pixel labeled as foreground and a sink node that is connected to each pixel labeled as background. Further, graphcut techniques also include calculation of weights for each pixel that indicate a likelihood of the pixel being background or foreground. The weights are assigned to edges that connect pixels to source node/sink node. In graphcut techniques, weights between the pixels are defined by the edge information or pixel similarity (color similarity). If there is a large difference in pixel color of two pixels, the edge connecting the two pixels is assigned a low weight. An iterative cut is performed to separate the foreground and background by removing edges, e.g., by minimizing a cost function. For example, the cost function can be the sum of weights of the edges that are cut.

In some implementations, the graphcut technique is applied to pixels of the frame that are classified as unknown in the trimap. In these implementations, pixels that are identified as known foreground and known background are excluded from the graphcut. In some implementations, when applying the graphcut technique, global color models are disabled. Disabling the global color models can save computation resources, e.g., by eliminating the need to build global color models for the foreground and background as described above, and instead, using the classification from the trimap.

Applying the graphcut technique for a small proportion of the frame (the unknown portion of the trimap) and excluding the known foreground and known background of the trimap can improve performance of the segmentation since pixels of the known foreground and known background are not added into the graph. For example, the size of the graph that is processed to obtain the binary mask may be lower than the size of the graph when color model based graphcut techniques as described above are utilized. In an example, excluding the known foreground and the known background can result in computational load for the graph cut that is about 33% of the computational load when the known foreground and the known background are included. Block 226 may be followed by block 228.

In block 228, a temporal low pass filter may be applied to the binary mask, e.g., that is generated by the graphcut technique. Applying the temporal low pass filter may be performed as part of performing fine segmentation. Depth values of corresponding pixels may vary between consecutive frames, even when the scene captured in the video is static. This may occur due to imperfect depth data being captured by the sensor. The temporal low pass filter updates the binary mask based on similarity between one or more previous frames and the current frame. For example, if the scene captured in the plurality of video frames is static, consecutive frames may include similar depth values for corresponding pixels. If there is variation in depth values for corresponding pixels while the scene is static, such depth values may be erroneous and are updated using the temporal low pass filter. If similarity between the one or more previous frames and the current frame is high, applying the temporal low pass filter results in segmentation of the current frame being made consistent with that of the one or more previous frames. The consistency produced by the temporal low pass filter is weaker when the similarity is low, e.g., when the scene is not static. Block 228 may be followed by block 230.

In block 230, a Gaussian filter may be applied to the binary mask as part of performing fine segmentation. The Gaussian filter may smooth the segmentation boundary in the binary mask. Applying the Gaussian filter can provide alpha matting, e.g., can ensure that the binary mask separates hairy or fuzzy foreground objects from the background. Block 230 may be followed by block 232.

In block 232, it is determined if there are more frames of the video for which the binary mask is to be determined. If it is determined that there is another frame to process, block 232 may be followed by block 213 to select the frame, e.g., the next frame in the sequence of frames. If there are no remaining frames (the entire video has been processed), block 232 may be followed by block 234.

In block 234, the respective binary mask obtained for each of the plurality of frames is upsampled, e.g., to the size of the original video and is utilized to obtain a foreground video. For example, a foreground mask for each frame of the video may be determined using the respective upsampled binary mask and may be utilized to identify pixels of the video that are to be included in the foreground video. Block 234 may be followed by block 236.

In block 236, the foreground video may be rendered. In some implementations, rendering the foreground video may include generating a plurality of frames that include the foreground, segmented using the binary mask. In some implementations, rendering may further include displaying a user interface that includes the foreground video. For example, the foreground video may be displayed in a video calling application or other application. In some implementations, the foreground video may be displayed without a background, e.g., a blank background. In some implementations, background different from the original background of the video may be provided along with the foreground video.

By subtracting the background and obtaining the foreground video, any suitable or user-preferred background can be provided for the video. For example, in a video calling application, the user may indicate a preference to substitute the background with a particular scene, and such background may be displayed with the foreground video. For example, replacing the background in this manner can allow a participant in a video call to remove from the video clutter in the room from where the participant has joined the video call by substituting the background portion.

In some implementations, method 200 may be implemented in a multithreaded manner, e.g., a plurality of threads that implement method 200 or portion thereof may be executed simultaneously, e.g., on a multicore processor, a graphics processor, etc. Further, the threads of method 200 may be executed simultaneously with other threads, e.g., one or more threads that capture the video and/or one or more threads that display the video after segmentation. In some implementations, segmentation is performed in real time. Some implementations can perform real time segmentation at the rate of thirty frames per second.

Detecting the head bounding box can improve the quality of segmentation of the frame. In many applications, e.g., video calling application, the human head, e.g., of a participant in the video call is a focus of attention of other participants. Therefore, detecting the boundaries of the head accurately is valuable to provide a high-quality foreground video. For example, a high-quality foreground video may include all (or nearly all) pixels that include the head of a participant while simultaneously excluding background pixels. In a high-quality foreground video, fine areas such as hair and neck are segmented accurately. Detecting the head bounding box can enable the foreground video to be a high-quality video.

In some implementations, one or more of the blocks illustrated in FIG. 2 may be combined. For example, blocks 218 and 220 may be combined, or performed in parallel. In another example, block 222 may be combined with block 224. In some implementations, one or more of the blocks may not be performed. For example, in some implementations, block 224 is not performed. In these implementations, no incoherence penalty weight is calculated. In another example, in some implementations, block 228 may not be performed. In some implementations, block 232 may not be performed such that the binary mask obtained after applying the Gaussian filter is used directly in block 234 to obtain the foreground video.

In some implementations, blocks of method 200 may be performed in parallel or in a different order than illustrated in FIG. 2. For example, in some implementations, the received video may be divided into a plurality of video segments that each include a subset of the video frames. Each video segment may then be processed using method 200 to obtain a foreground segment. In these implementations, different video segments may be processed in parallel and the obtained foreground segments may be combined to form a foreground video.

In some implementations, the foreground video may be rendered in real time, e.g., such that there is little or no perceivable lag between capture of the video and rendering or display of the foreground video. In some implementations, upsampling and foreground video rendering (blocks 234 and 236) may be performed for one portion of the video in parallel with block 213-232 for a subsequent portion of the video.

Performing method 200, or portions thereof, in parallel to rendering foreground video may enable displaying the foreground video in real time, without user perceivable lag. Further, parallel execution (e.g., using a multithreaded approach) may make advantageous use of available hardware resources, e.g., a plurality of cores of a multicore processor, graphics processor, etc.

Method 200 may be performed by a client device (e.g., any of client devices 120-126) and/or a server device, e.g., server device 104. For example, in some implementations, a client device may capture a video and perform method 200 to render the foreground video locally. For example, method 200 may be performed locally when the client device has suitable processing hardware, e.g., a dedicated graphics processing unit (GPU) or another image processing unit, e.g., an ASIC, FPGA, etc. In another example, in some implementations, a client device may capture a video and send the video to a server device that performs method 200 to render the foreground video. For example, method 200 may be performed by a server device when client devices lack processing capability to perform method 200 or in other circumstances, e.g., when battery power available on the client device is below a threshold. In some implementations, method 200 may be performed by client devices other than the device that captured the video. For example, a sender device in a video call may capture and send video frames to a receiver device. The receiver device may then perform method 200 to render the foreground video. Such implementations may be advantageous when the sender device lacks the capability to perform method 200 in real time.

Figure 3:
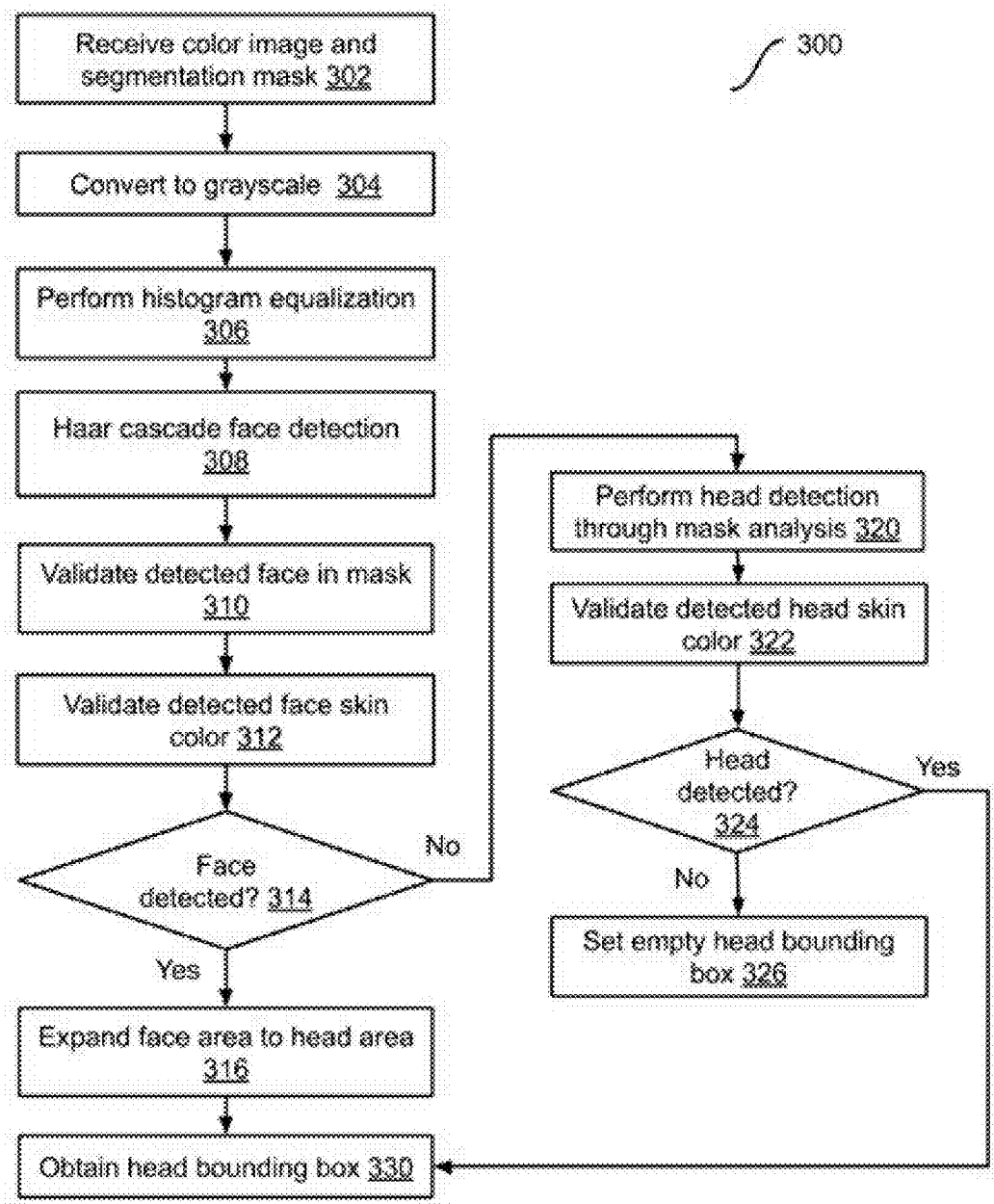
FIG. 3 is a flow diagram illustrating an example method to detect a head bounding box, according to some implementations.

FIG. 3 is a flow diagram illustrating an example method 300 to detect a head bounding box, according to some implementations. For example, method 300 may be utilized to detect a head bounding box for a video frame in block 216.

Method 300 may begin at block 302. In block 302, a color image (e.g., a frame of a video) and a corresponding segmentation mask may be received. For example, the segmentation mask may be an initial segmentation mask, determined from depth data of a video frame, e.g., as determined in block 214 of method 200. The initial segmentation mask may be binary, e.g., the initial segmentation mask may classify each pixel in the color image as foreground pixel or background pixel. Block 302 may be followed by block 304.

In block 304, the received image (frame) is converted to grayscale. Block 304 may be followed by block 306.

In block 306, histogram equalization is performed on the grayscale image. Block 306 may be followed by block 308.

In block 308, Haar cascade face detection is performed to detect one or more faces in the image. For each detected face, a face area is identified that includes face pixels that correspond to the face. Block 308 may be followed by block 310.

In block 310, the detected faces are validated using the initial segmentation mask. In some implementations, for each detected face, it is determined whether at least a threshold proportion of pixels of the face area are categorized as foreground pixels in the initial segmentation mask. Block 310 may be followed by block 312.

In block 312, it is also determined whether the detected face has sufficient skin area. The determination of whether the detected face has sufficient skin area may include determining whether at least a threshold percentage of pixels of the face area are of skin color. For example, determination of whether a pixel is of skin color may be performed based on color values of the pixel. In some implementations, color values of pixels in the color data of the frame may be RGB values. In some implementations, skin color detection may be performed for each pixel to determine whether it may be of skin color by using a skin color criterion, given by the formula:

is_skin=$R>95$ AND $G>40$ AND $B>20$ AND $(R-G)>15$ AND $R>B$ where R, G, and B refer to the red, green, and blue color channel values for the pixel.

In some implementations, blocks 310 and 312 may be performed for each detected face in the image. Block 312 may be followed by block 314.

In block 314, it is determined whether the image includes at least one valid face. For example, block 314 may be performed for each detected face. In some implementations, a face is determined to be valid if it is verified that the face area for the face includes at least the threshold proportion of pixels categorized as foreground pixels and that at least a threshold percentage of pixels of the face area of the face are of skin color. In some implementations, the threshold proportion of pixels categorized as foreground pixels may be 0.6 (60%) and the threshold percentage of pixels of the face area of the face that are of skin color may be 0.2 (20%). If at least valid face is detected in block 314, block 314 may be followed by block 316. If no face is detected, block 314 may be followed by block 320.

In block 316, the face area for each valid face is expanded to cover head area. In some implementations, expansion may be performed expanding a face bounding box for a valid face by a particular percentage. Block 316 may be followed by block 330.

In block 330, the head bounding box may be obtained. For example, the head bounding box may include the face area and additionally, a hair region, neck region, or collar region. The head bounding box may identify multiple distinct regions of the image, e.g., if the image includes a plurality of valid faces.

In block 320, the initial segmentation mask is analyzed to detect a head in the image. In some implementations, horizontal scan lines based on the initial segmentation mask are first calculated. Connections of the scanlines are analyzed, and based on the connection, a location and/or a size is determined to detect the location of the head area. Block 320 may be followed by block 322.

In block 322, it is determined whether the detected head is valid. For example, the determination may be based on performing validation of the head skin color, e.g., similar to validation of face skin color in block 312. Block 322 may be followed by block 324.

In block 324, it is determined if a valid head is detected in the image. If a valid head is detected, block 324 may be followed by block 330. If no head is detected, block 324 may be followed by block 326.

In block 326, the head bounding box may be set as empty or null such that no pixels of the image are in the head bounding box. An empty head bounding box may indicate that no head was detected in the image. When no head is detected, the trimap for the non-head portions is the trimap for the frame. In some implementations, head detection may be turned off, such that all areas of the image are treated similarly in the trimap.

Method 300 may provide several technical benefits. For example, use of Haar cascade face detection technique can detect multiple heads, e.g., when multiple persons are present in the frame. Further, the validation of the face, as described with reference to blocks 310 and 312 can ensure that false positives (non-face areas erroneously identified as face areas during Haar cascade face detection of block 308) are eliminated. Further, face area expansion, as described with reference to block 316 can ensure that regions such as hair, neck, collar, etc. are identified as known foreground in the trimap, thereby enabling high quality segmentation.

Still further, if no face is detected by Haar face detection (or if detected faces are not validated), a head bounding box can be constructed by mask analysis of the initial segmentation mask and validation, as described with reference to blocks 320 and 322. The technique can thus compensate for false negatives, e.g., situations where Haar cascade face detection fails to detect a face. In some implementations, mask analysis based head detection can provide a high detection ratio (e.g., higher than Haar cascade face detection) and has lower computational cost.

Figure 4:
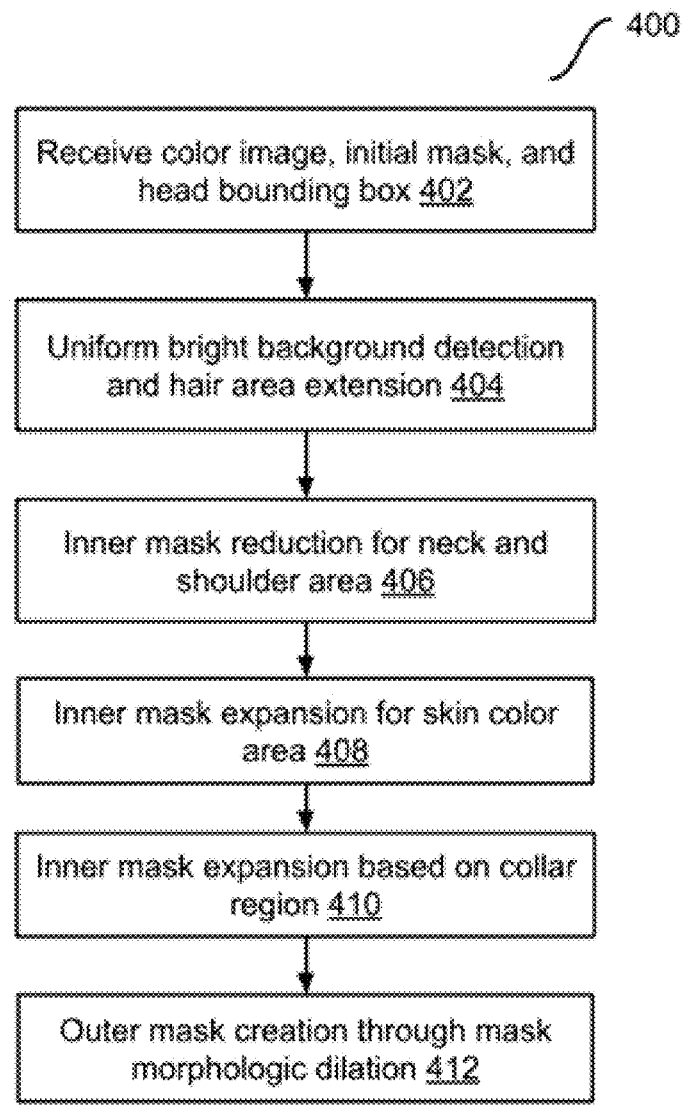
FIG. 4 is a flow diagram illustrating an example method to generate a trimap for a head region, according to some implementations.

FIG. 4 is a flow diagram illustrating an example method 400 to generate a trimap for a head region, according to some implementations. Method 400 may begin at block 402.

In block 402, a color image, a depth mask (e.g., initial segmentation mask), and a head bounding box may be received. For example, the color image may correspond to a frame of a video and may include color data for pixels of the frame. Block 402 may be followed by block 404.

In block 404, it is detected whether the background near the head area (e.g., as identified by the head bounding box). For example, it may be detected whether pixels of the image that are near the head area, e.g., near the hair area, are bright and uniform. Such background can often lead to the depth sensor of the camera failing to detect depth of the hair area or detecting an incorrect depth for the hair area. Extension of the hair area is performed if uniform bright background is detected near the head area. Extension of the hair area causes an increase in the dilation size to create an outer mask. Block 404 may be followed by block 406.

In block 406, inner mask reduction for neck and/or should area is performed to obtain an inner mask. In the inner mask, areas around the neck (or shoulder) are erased. Such erasure can compensate for erroneous or unreliable depth data near the neck area. Block 406 may be followed by block 408.

In block 408, inner mask expansion is performed. For example, pixels near the inner mask that are of skin color may be analyzed to determine if the pixels are of skin color. If the pixels are of skin color, such pixels are added to the inner mask which can avoid excessive erosion, e.g., that may occur when performing block 406. Block 408 may be followed by block 410.

In block 410, the collar region of the inner mask may be expanded. This can also avoid excessive erosion, e.g., that may occur when performing block 406, e.g., for the collar area. Block 410 may be followed by block 412.

In block 412, mask morphologic dilation is performed to obtain an outer mask. Block 412 may be followed by block 414. Method 400 may improve the trimap of the head region, e.g., in the neck and collar region, where depth data captured by the camera is often less reliable than in other portions. Use of skin color to identify foreground areas can improve the trimap.

Figure 5:
FIG. 5 illustrates an example video frame and a corresponding initial segmentation mask.
Figure 5:
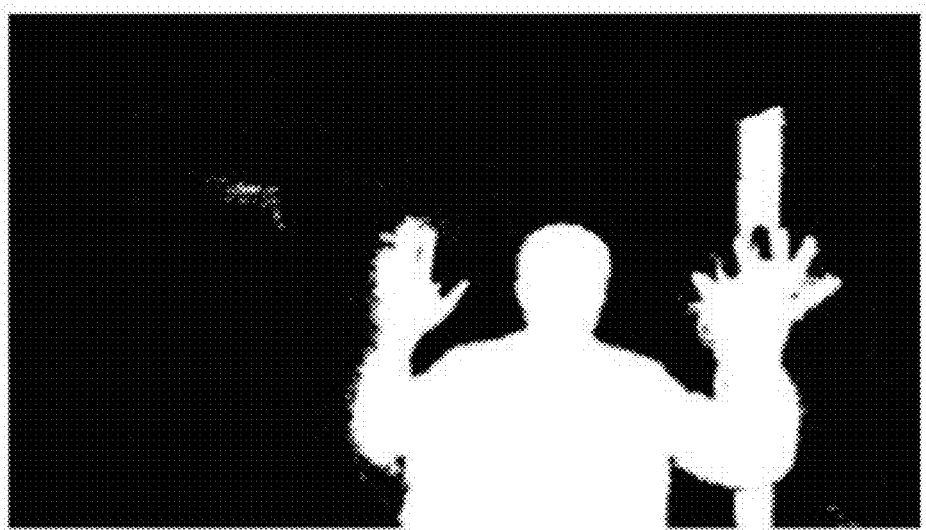

FIG. 5 illustrates an example video frame having a color portion (502) and a corresponding mask (504). As can be seen in FIG. 5, the foreground of the video frame (502) includes a person with raised arms. The background of the video frame includes an office environment with a whiteboard and another person at a workstation with their back to the person in the foreground.

Mask (504) may be an initial segmentation mask. For example, mask (504) may be a segmentation mask that categorizes each pixel of the frame (502) as foreground pixel or background pixel. In FIG. 5, foreground pixels of the mask are in white color while background pixels are in black color. As can be seen, the segmentation mask does not accurately categorize the pixels of the frame.

For example, several white pixels are seen in the top left quadrant of the image. These pixels correspond to a background portion of the image but are categorized as foreground in the mask. In another example, portions of the glass window and whiteboard near the left arm of the person in the foreground are erroneously categorized as foreground. Still further, while individual fingers of the person can be seen in the color image, the mask does not accurately depict the finger regions. A foreground frame that can be obtained using the mask of FIG. 5 therefore is low in quality due to these segmentation errors.

Figure 6:
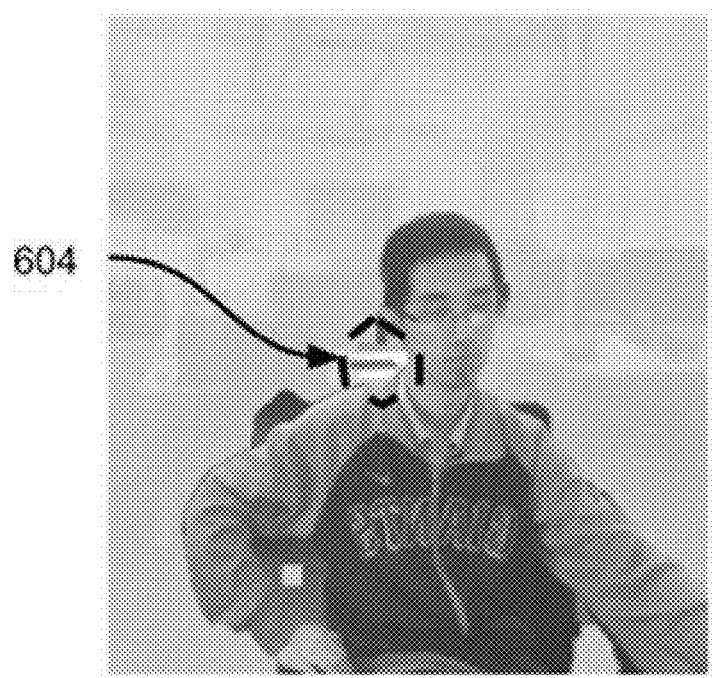
FIG. 6 illustrates two example images with foreground and background separated, without the use of a trimap.
Figure 6:
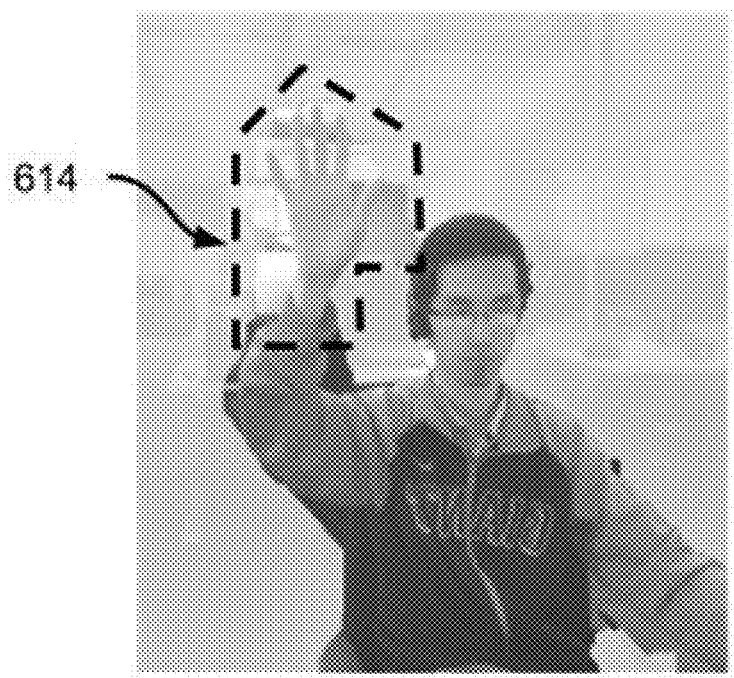

FIG. 6 illustrates two example images with foreground and background separated, without the use of a trimap as described above. In a first image (602), it can be seen that while the rest of the image correctly separates the background (in light gray) from the foreground that includes the person, an area (604) near the neck of the person is incorrectly identified as foreground. In a second image (612), it can be seen that while the rest of the image correctly separates the background (in light gray) from the foreground that includes the person, an area (614) near the raised hand of the person is incorrectly identified as foreground. In each image (602, 612), a portion of the foreground, e.g., the neck region (604) and the finger and hand region (614) of the person, is thus not correctly segmented, since portions of the background are incorrectly identified as foreground.

Figure 7:
FIG. 7 illustrates an example image with portions of the trimap identified.

FIG. 7 illustrates an example image (702) with portions of the trimap identified. In FIG. 7, the pixels of the image with modified colors, different from the pixel colors of the original image are classified as unknown in the trimap. Three separate colors are utilized to illustrate portions of the trimap with different weights. The red portion of image 702 has a foreground weight in the weight map. The blue portion of image 702 has a background weight in the weight map. The green portion of image 702 has a neutral (e.g., zero) weight in the weight map and is classified as unknown.

As can be seen in FIG. 7, the red portion is nearer to the person's body than other portions of the trimap, e.g., red pixels can be seen near the inner half of the right arm and right side regions, than the green portion and the blue portion. Further, the green portion that is closer to the person's body, e.g., as can be seen on the outer portion of the left arm of the person in the image. Blue portions that are classified in the trimap as background are seen to be further away from the person's body.

The trimap and the weight map, when provided as input to a graphcut algorithm, includes weights that penalize classification of foreground regions (outer portion of the arm or other portions of the person's body) as background and that enable correctly removing the background by background weights. Use of a specially generated trimap that includes head-specific optimization, e.g., by generating a head portion trimap with use of a head bounding box, and skin area detection (e.g., hand region), thus enables the output of graphcut to provide improved segmentation of the image. For example, a custom implementation of graphcut that enables running graphcut over only the pixels classified as unknown is utilized. \ Since the graphcut is applied only to a small portion of the image, e.g., pixels classified as unknown in the trimap (modified color portions of FIG. 7) and other pixels are not added to the graph, computational cost to perform graphcut is reduced. In some implementations, the processing time for graphcut using the trimap may be less than about one-third of the processing time for the entire image.

Figure 8:
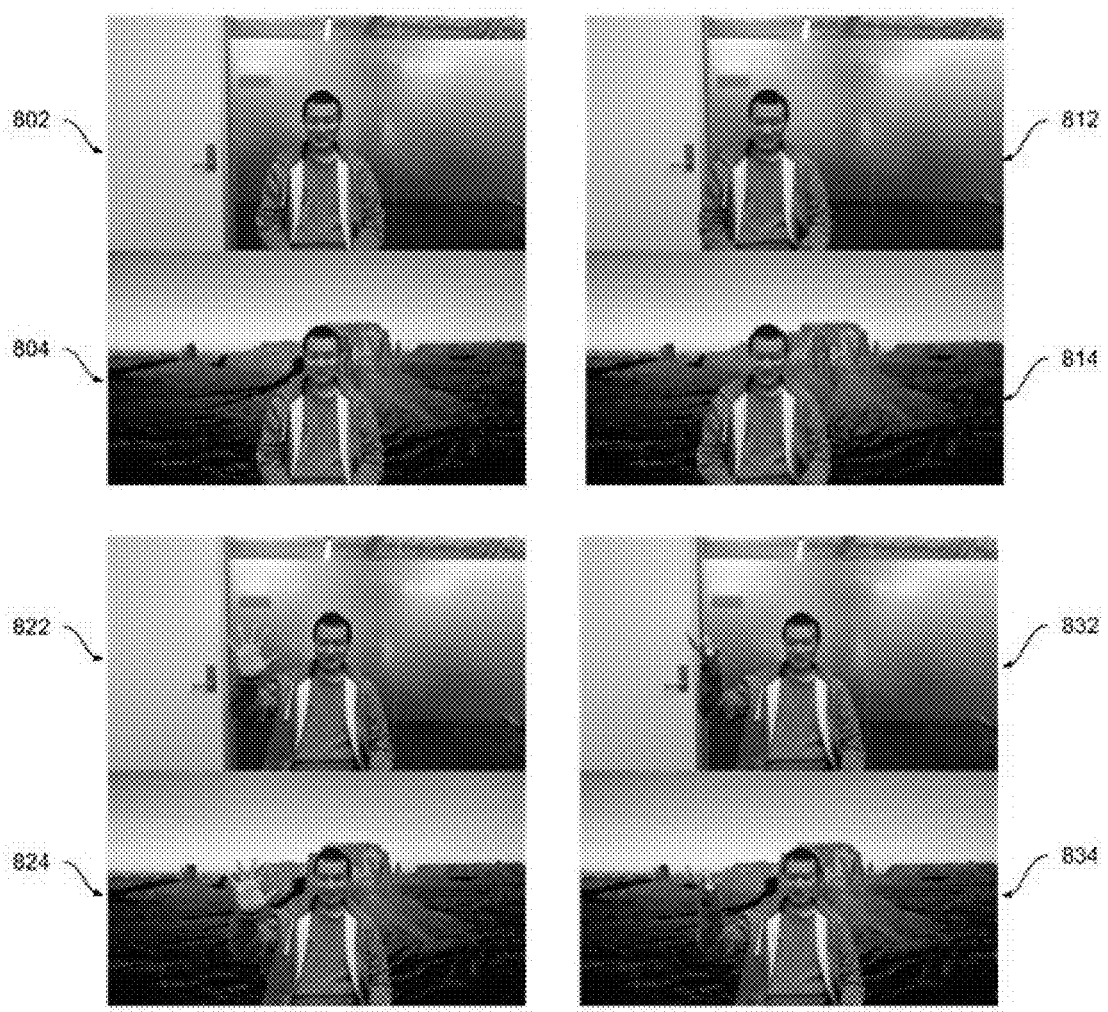
FIG. 8 illustrates four frames of an input video and corresponding output frames of an output video that includes a foreground generated by segmenting the input video, according to some implementations.

FIG. 8 illustrates four frames (802, 812, 822, 832) of an input video and corresponding output frames (804, 814, 824, 834) of an output video that includes a foreground generated by segmenting the input video according to some implementations. As can be seen, in each of the output frames, the foreground is separated from the background of the conference room, which has been replaced with a mountain scene. Specifically, the segmentation is accurate in the presence of motion. For example, the person in the foreground moves between frame 802 and 812; raises a hand with fingers separated in frame 822; and turns the hand in frame 832. In each case, the corresponding output frame correctly segments the foreground, since no portion (or only a minimal portion) of the original background is seen in the corresponding output frames.

Figure 9:
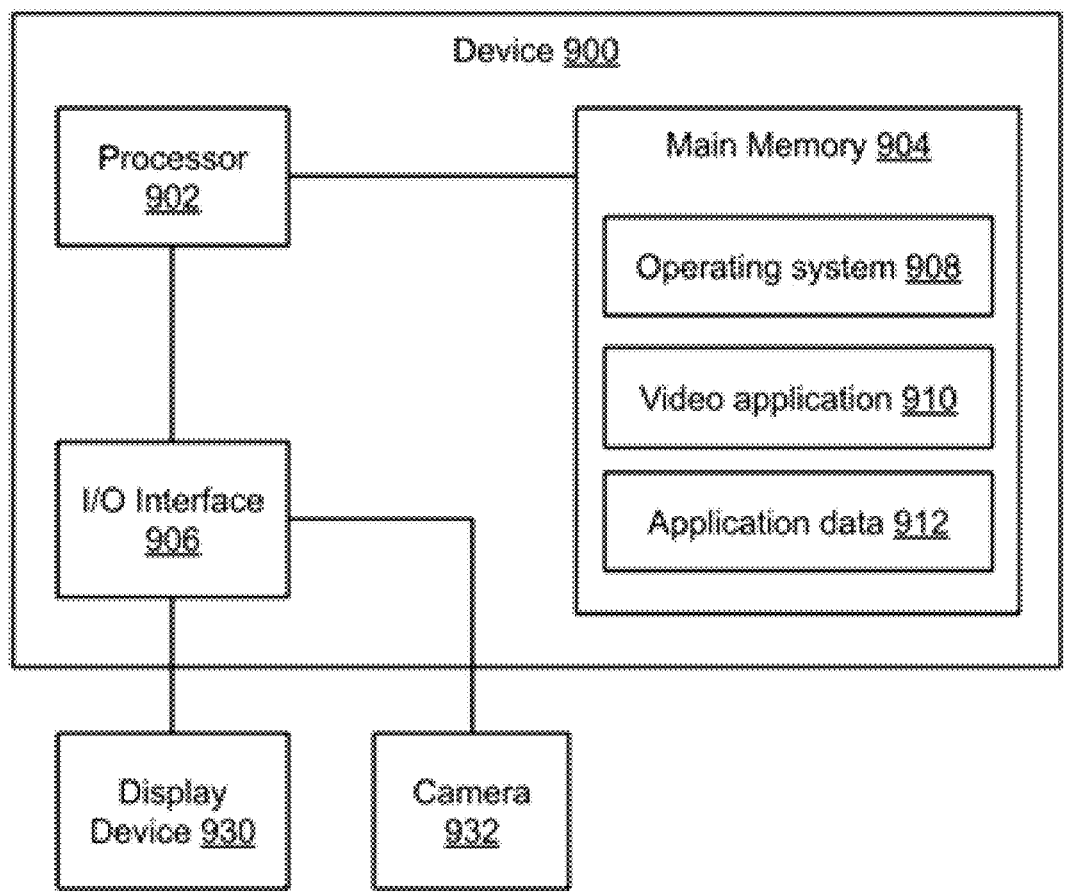
FIG. 9 is a block diagram of an example computing device which may be used for one or more implementations described herein.

FIG. 9 is a block diagram of an example device 900 which may be used to implement one or more features described herein. In one example, device 900 may be used to implement a client device, e.g., any of client devices shown in FIG. 1. Alternatively, device 900 can implement a server device, e.g., server system 102 or server device 104. In some implementations, device 900 may be used to implement a client device, a server device, or both client and server devices. Device 900 can be any suitable computer system, server, or other electronic or hardware device as described above.

One or more methods described herein can be run in a standalone program that can be executed on any type of computing device, a program run on a web browser, a mobile application ("app") run on a mobile computing device, e.g., cell phone, smart phone, tablet computer, wearable device (wristwatch, armband, jewelry, headwear, virtual reality goggles or glasses, augmented reality goggles or glasses, head mounted display, etc.), laptop computer, etc. In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 900 includes a processor 902, a memory 904, an input/output (I/O) interface 906, and a camera 914. Processor 902 can be one or more processors and/or processing circuits to execute program code and control basic operations of the device 900. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 902 may include a CPU and a GPU (or other parallel processor). In the implementations, the GPU or parallel processor may include a plurality of processing cores, e.g., 100 cores, 1000 cores, etc. that may perform computation in parallel. Further, the GPU or parallel processor may include a GPU memory separate from main memory 904. The GPU memory may be accessible by each GPU core. An interface may be provided to enable data to be transferred between main memory 904 and the GPU memory.

In some implementations, the GPU may be utilized to implement methods 200, 300, or 400 or parts thereof. In particular, the GPU may be utilized to render video frames based on segmentation of the background and the foreground, e.g., to render a foreground video after subtracting the background. The GPU may also substitute the background with a different background. In some implementations, color data and depth data may be stored in the GPU memory (also referred to as GPU buffers). In these implementations, the color and depth data may be processed by the GPU which may be faster than processing the data using the CPU.

In some implementations, processor 902 may include one or more co-processors that implement neural-network processing. In some implementations, processor 902 may be a processor that processes data to produce probabilistic output, e.g., the output produced by processor 902 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908, a video calling application 910, and application data 912. One or more other applications may also be stored in memory 904. For example, other applications may include applications such as a data display engine, web hosting engine, image display engine, notification engine, social networking engine, image/video editing application, media sharing application, etc. In some implementations, video calling application 910 and/or other applications can each include instructions that enable processor 902 to perform functions described herein, e.g., some or all of the methods of FIG. 2, 3, or 4. One or more methods disclosed herein can operate in several environments and platforms, e.g., as a standalone computer program that can run on any type of computing device, as a web application having web pages, as a mobile application ("app") run on a mobile computing device, etc.

Application data 912 can include a video, e.g., a sequence of video frames. In particular, application data 912 can include color data and depth data for each frame of a plurality of video frames of a video.

Any of software in memory 904 can alternatively be stored on any other suitable storage location or computer-readable medium. In addition, memory 904 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 904 and any other type of storage (magnetic disk, optical disk, magnetic tape, or other tangible media) can be considered "storage" or "storage devices."

I/O interface 906 can provide functions to enable interfacing the device 900 with other systems and devices. Interfaced devices can be included as part of the device 900 or can be separate and communicate with the device 900. For example, network communication devices, storage devices (e.g., memory and/or database 106), and input/output devices can communicate via I/O interface 906. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 906 can include one or more display devices 930 that can be used to display content, e.g., images, video, and/or a user interface of an output application as described herein. Display device 930 can be connected to device 900 via local connections (e.g., display bus) and/or via networked connections and can be any suitable display device. Display device 930 can include any suitable display device such as an LCD, LED (including OLED), or plasma display screen, CRT, television, monitor, touchscreen, 3-D display screen, or other visual display device. For example, display device 930 can be a flat display screen provided on a mobile device, multiple display screens provided in a goggles or headset device, or a monitor screen for a computer device.

The I/O interface 906 can interface to other input and output devices. Some examples include a camera 932 which can capture images and/or videos. In particular, camera 932 may capture color data and depth data for each video frame of a video. Some implementations can provide a microphone for capturing sound (e.g., as a part of captured images, voice commands, etc.), audio speaker devices for outputting sound, or other input and output devices.

For ease of illustration, FIG. 9 shows one block for each of processor 902, memory 904, I/O interface 906, software blocks 908 and 910, and application data 912. These blocks may represent one or more processors or processing circuitries, operating systems, memories, I/O interfaces, applications, and/or software modules. In other implementations, device 900 may not have all of the components shown and/or may have other elements including other types of elements instead of, or in addition to, those shown herein. While some components are described as performing blocks and operations as described in some implementations herein, any suitable component or combination of components of environment 100, device 900, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   receiving a plurality of frames of a video, wherein each frame includes depth data and color data for a plurality of pixels;
   downsampling each frame of the plurality of frames of the video to obtain a corresponding downsampled frame that includes a subset of the plurality of pixels excluding one or more of the plurality of pixels;
   after the downsampling, for each downsampled frame:
      based on the depth data, generating an initial segmentation mask that categorizes each pixel of the downsampled frame as foreground pixel or background pixel;
      detecting a head bounding box based on one or more of the color data or the initial segmentation mask;
      determining a trimap that classifies each pixel of the downsampled frame as one of known background, known foreground, or unknown, wherein determining the trimap comprises:
         generating a first trimap for non-head portions of the frame, wherein the non-head portions exclude pixels within the head bounding box,
         generating a second trimap for head portions of the frame, wherein the head portions exclude pixels outside the head bounding box, and
         merging the first trimap with the second trimap;
      for each pixel of the downsampled frame that is classified in the trimap as unknown, calculating a weight for the pixel and storing the weight in a weight map; and
      performing fine segmentation based on the color data, the trimap, and the weight map to obtain a binary mask for the downsampled frame; and
   upsampling the plurality of downsampled frames based on the binary mask for each respective frame to obtain a foreground video.

2. The computer-implemented method of claim 1, wherein generating the initial segmentation mask comprises setting a pixel as foreground pixel if a depth value associated with the pixel is within a depth range and setting the pixel as background pixel if the depth value associated with the pixel is outside the depth range.

3. The computer-implemented method of claim 2, wherein generating the initial segmentation mask further comprises performing one or more of a morphological opening process or a morphological closing process.

4. The computer-implemented method of claim 1, wherein detecting the head bounding box comprises:
   converting the frame to grayscale;
   after the converting, performing histogram equalization; and
   after the histogram equalization, detecting one or more faces in the frame by Haar cascade face detection wherein each face of the one or more faces is associated with a face area that includes face pixels for the face.

5. The computer-implemented method of claim 4, further comprising determining whether each face of the one or more faces is valid, wherein the face is determined as valid if it is verified that a threshold proportion of pixels of the face area for the face are categorized as foreground pixels in the initial segmentation mask and that at least a threshold percentage of pixels of the face area for the face meet a skin color criterion.

6. The computer-implemented method of claim 5, further comprising, for each face determined as valid, expanding the face area for each face to obtain a head area corresponding to the face, and wherein the head bounding box includes the head area for each face determined as valid.

7. The computer-implemented method of claim 5, further comprising, if no face is determined to be valid:
analyzing the initial segmentation mask to detect a head;
determining whether the head is valid based by head skin color validation; and
if the head is valid, selecting a bounding box associated with the head as the head bounding box.

8. The computer-implemented method of claim 1, wherein generating the initial segmentation mask comprises assigning a mask value to each pixel, wherein each foreground pixel is assigned the mask value of 255 and each background pixel is assigned the mask value of 0, and wherein generating the first trimap comprises, for each pixel of the frame that is not in the head bounding box:
calculating an L1 distance between a pixel location of the pixel and a mask boundary of the initial segmentation mask, wherein the mask boundary includes locations where at least one foreground pixel is adjacent to at least one background pixel in the initial segmentation mask;
if the L1 distance meets a foreground distance threshold and the pixel is categorized as foreground pixel, classifying the pixel as known foreground;
if the L1 distance meets a background distance threshold and the pixel is categorized as background pixel, classifying the pixel as known background; and
classifying the pixel as unknown if the pixel is not classified as known foreground and not classified as known background.

9. The computer-implemented method of claim 8, wherein generating the second trimap comprises identifying, for each pixel in the head bounding box, whether the pixel is known foreground, known background, or unknown, wherein the identifying comprises:
classifying the pixel as known foreground if the pixel is in an inner mask determined for the head bounding box;
classifying the pixel as known background if the pixel is outside an outer mask determined for the head bounding box; and
classifying the pixel as unknown if the pixel is not classified as known foreground and known background.

10. The computer-implemented method of claim 9, further comprising, prior to the identifying:
detecting whether uniform bright background is present near a hair area of a head in the head bounding box; and
if uniform bright background is detected, performing hair area extension for the head based on the head bounding box, the color data, and the initial segmentation mask, wherein after performing the hair area extension, a dilation size for the outer mask is increased.

11. The computer-implemented method of claim 1, further comprising:
maintaining a background image for the video, wherein the background image is a color image of same size as each frame of the video; and
prior to performing the fine segmentation, updating the background image based on the trimap, and wherein calculating the weight for the pixel comprises:
calculating Euclidean distance between a color of the pixel and a background color of the background image;
determining a probability that the pixel is background pixel based on the Euclidean distance; and
if the probability meets a background probability threshold, assigning a background weight to the pixel in the weight map.

12. The computer-implemented method of claim 11, further comprising:
identifying one or more skin regions in the frame based on skin color detection, wherein the one or more skin regions excludes face regions; and for each pixel of the frame that is within the one or more skin regions:
classifying the pixel as unknown and assigning the pixel a zero weight in the weight map;
if a color of the pixel and the background color of the background image meet a similarity threshold, assigning the pixel a background weight in the weight map;
if the color of the pixel is skin color, assigning the pixel a foreground weight in the weight map; and
if the color of the pixel and the background color of the background image meet a dissimilarity threshold, assigning the pixel a foreground weight in the weight map.

13. The computer-implemented method of claim 1, wherein the plurality of frames are in a sequence, the method further comprising, for each frame:
comparing the initial segmentation mask with a previous frame binary mask of an immediately previous frame in the sequence to determine a proportion of the pixels of the frame that are categorized similar to pixels of the previous frame;
based on the proportion, calculating a global coherence weight; and
wherein calculating the weight for the pixel and storing the weight in the weight map comprises determining the weight based on the global coherence weight and distance between the pixel and a mask boundary of the previous frame binary mask.

14. The computer-implemented method of claim 13, wherein the weight for the pixel is positive if a corresponding pixel was categorized as foreground pixel in the previous frame binary mask and the weight is negative if the corresponding pixel was not categorized as foreground pixel in the previous frame binary mask.

15. The computer-implemented method of claim 1, wherein performing fine segmentation comprises applying a graphcut technique to the frame, wherein the graphcut technique is applied to pixels that are classified as unknown.

16. The computer-implemented method of claim 1, further comprising, after performing fine segmentation, applying a temporal low pass filter to the binary mask, wherein the temporal low pass filter updates the binary mask based on similarity between one or more previous frames and the frame.

17. A non-transitory computer-readable medium with instructions stored thereon that, when executed by one or more hardware processors, cause the one or more hardware processors to perform operations comprising:
receiving a plurality of frames of a video, wherein each frame includes depth data and color data for a plurality of pixels;
downsampling each frame of the plurality of frames of the video to obtain a corresponding downsampled frame that includes a subset of the plurality of pixels excluding one or more of the plurality of pixels;
after the downsampling, for each downsampled frame:
   based on the depth data, generating an initial segmentation mask that categorizes each pixel of the downsampled frame as foreground pixel or background pixel;
   detecting a head bounding box based on one or more of the color data or the initial segmentation mask;
   determining a trimap that classifies each pixel of the downsampled frame as one of known background, known foreground, or unknown, wherein determining the trimap comprises:
      generating a first trimap for non-head portions of the frame, wherein the non-head portions exclude pixels within the head bounding box,
      generating a second trimap for head portions of the frame, wherein the head portions exclude pixels outside the head bounding box, and
      merging the first trimap with the second trimap;
   for each pixel of the downsampled frame that is classified in the trimap as unknown, calculating a weight for the pixel and storing the weight in a weight map; and
   performing fine segmentation based on the color data, the trimap, and the weight map to obtain a binary mask for the downsampled frame; and
upsampling the plurality of downsampled frames based on the binary mask for each respective frame to obtain a foreground video.

18. The non-transitory computer-readable medium of claim 17, with further instructions stored thereon that, when executed by the one or more hardware processors, cause the one or more hardware processors to perform operations comprising:
   maintaining a background image for the video, wherein the background image is a color image of same size as each frame of the video; and
   prior to performing the fine segmentation, updating the background image based on the trimap, and wherein calculating the weight for the pixel comprises:
      calculating Euclidean distance between a color of the pixel and a background color of the background image;
      determining a probability that the pixel is background pixel based on the Euclidean distance; and
      if the probability meets a background probability threshold, assigning a background weight to the pixel in the weight map.

19. A system comprising:
one or more hardware processors; and
a memory coupled to the one or more hardware processors, with instructions thereon, that when executed by the one or more hardware processors to perform operations comprising:
receiving a plurality of frames of a video, wherein each frame includes depth data and color data for a plurality of pixels;
downsampling each frame of the plurality of frames of the video to obtain a corresponding downsampled frame that includes a subset of the plurality of pixels excluding one or more of the plurality of pixels;
after the downsampling, for each downsampled frame:
   based on the depth data, generating an initial segmentation mask that categorizes each pixel of the downsampled frame as foreground pixel or background pixel;
   detecting a head bounding box based on one or more of the color data or the initial segmentation mask;
   determining a trimap that classifies each pixel of the downsampled frame as one of known background, known foreground, or unknown, wherein determining the trimap comprises:
      generating a first trimap for non-head portions of the frame, wherein the non-head portions exclude pixels within the head bounding box,
      generating a second trimap for head portions of the frame, wherein the head portions exclude pixels outside the head bounding box, and
      merging the first trimap with the second trimap;
   for each pixel of the downsampled frame that is classified in the trimap as unknown, calculating a weight for the pixel and storing the weight in a weight map; and
   performing fine segmentation based on the color data, the trimap, and the weight map to obtain a binary mask for the downsampled frame; and
upsampling the plurality of downsampled frames based on the binary mask for each respective frame to obtain a foreground video.

* * * * *